July 30, 1968 H. F. McGRATH ETAL 3,395,363
MULTI-FUNCTION GENERATOR
Filed Oct. 28, 1966
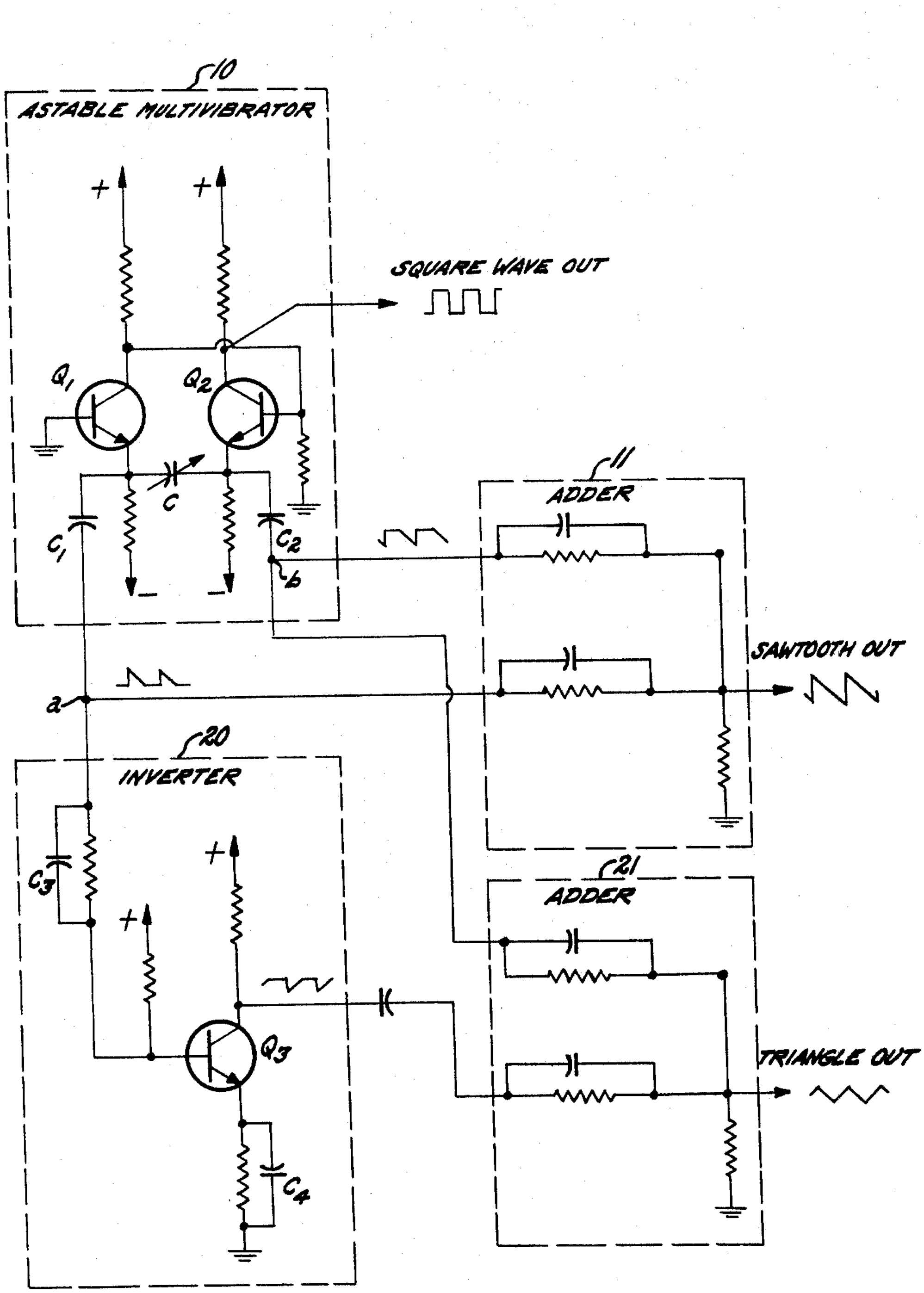
INVENTORS
HUGH F. McGRATH
GEORGE B. MICHEL
BY Harry A. Herbert Jr. and Herbert E. Herman
ATTORNEYS

1

3,395,363

MULTI-FUNCTION GENERATOR

Hugh F. McGrath and George B. Michel, Baltimore, Md., assignors, by mesne assignments, to the United States of America as represented by the Secretary of the Air Force Filed Oct. 28, 1966, Ser. No. 590,409
3 Claims. (Cl. 331—61)

ABSTRACT OF THE DISCLOSURE

A variable-frequency waveform apparatus generating three simultaneously different voltage waveforms from a single astable multivibrator. The three simultaneous waveforms which operate at the same selected frequency are respectively, a square wave, a sawtooth wave and a triangle wave.

This invention relates to voltage waveform generators, and more particularly, to a multi-function generator having transistors as generating elements which provide a plurality of voltage waveform outputs.

The instant multi-function generator has a general utility and a particular utility; the output voltage waves can be amplified to meet particular applications such as in television cameras and receivers.

The objects and advantages of this invention, which will become apparent from the subsequent detailed description of the drawing, are achieved by the utilization of an astable multivibrator as the unstable element which, in switching between unsaturated states, supplies the basic voltage variations. The output of the astable multivibrator is a square wave. By adding the two emitter voltage variations in a high impedance adder network, a sawtooth waveform is produced. To obtain a triangular wave, one of the emitter voltages is fed through an inverter and this inverted wave is then added to the other emitter voltage.

The novel features that are considered characteristic of this invention are set forth with particularity in the appended claims. The invention itself, however, both as to its organization and to additional objects and advantages thereof will best be understood by reference to the following description when read in connection with the accompanying drawing which is a schematic diagram of the principle of the invention and the best mode which has been contemplated of applying that principle.

Now referring to the drawing, shown are the function blocks used in the instant generator which is capable of simultaneously delivering three (3) different voltage waveforms which are all derived from a single astable multivibrator. The operating frequency is the same for all the waveforms and is variable from less than 10 kc./s. to more than 1 mc./s. Conventional biasing means are provided for each transistor.

Astable multivibrator 10 is the unstable element which, in switching between unsaturated states, supplies the basic voltage variations. As expected, a good square wave is available at the collector of either stage $Q_1$ or $Q_2$, provided that symmetry is observed. The stages are cut on and off by the variation in level across the emitter capacitor C. When the voltage on the emitter of $Q_1$ is large enough to forward bias the emitter-base junction, stage 1 conducts. As the current through the stage 1 charges up the capacitor C, the voltage on emitter 2 decreases until the emitter-base junction of stage 2 becomes forward biased and conducts. Stage 1 turns off as its emitter current decreases. This action increases the base voltage on stage 2 and holds stage 2 in conduction. Then the current in stage 2 charges up the capacitor C until it turns stage 1 on and the process is repeated.

2

The quasi linear voltage decays across the emitter to emitter coupling capacitor C, which causes the stages to be turned on or off, does not affect the voltage variation at the collectors. At the collectors, the transistor is either on or off and the voltage changes level (jumps) up or down correspondingly. Because the stages are not saturated, the switching time is low and the result is a rise time of less than a microsecond.

Using the quasi linear voltage decays developed across the emitter to emitter capacitor, a triangular wave and a sawtooth wave can be formed. These emitter voltage decays are shown at their respective points, *a* and *b*, in the drawing.

It is seen that by directly adding the two emitter voltage variations a sawtooth wave can be obtained. This is accomplished by high impedance adder network 11 so that multivibrator 10 is not excessively loaded. The amplitude of this sawtooth is approximately twice the amplitude of the individual voltage inputs.

To obtain a triangular wave, one of the emitter voltages is put through inverter 20 to change the direction of its slope. When this inverted wave is added in adder 21 to the other emitter voltage change a good triangular wave is formed. Speed-up capacitor $C_3$ is necessary in this inverted stage to insure proper joining of the two slopes. As the multivibrator is symmetrical the slopes of this wave will have the same value and only differ in sign.

All of the output voltages can be put into a high enough impedance so that the operation of the multivibrator is not affected. Then these voltage waves may be amplified to meet particular applications.

While there has been shown and described and pointed out the fundamental novel features of the invention as applied to the preferred embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claims.

We claim:

1. A voltage waveform generating circuit for simultaneously delivering a square wave, a sawtooth wave and a triangular wave output comprising an astable multivibrator including first and second transistor stage means, each of said transistors having a base, an emitter and a collector electrode, biasing means for each of said transistor stages, first and second capacitor means connected to their corresponding emitter electrode of said first and second transistor stage means, emitter coupling capacitance means connected intermediate said first and second emitter electrodes, first adder means connected to the outputs of said first and second emitter electrodes for directly adding the two emitter voltage variations developed across said emitter coupling capacitance means to provide a sawtooth wave output, inverter means connected to the output side of said first capacitance means connected to said first transistor stage, and second adder means connected to the output side of said second capacitance means and to the output of said inverter means for providing a triangular wave output.

2. The circuit as described in claim 1 wherein each of said first and second adder means comprises a high impedance resistance-capacitance network to prevent overloading of said astable multivibrator.

3. The circuit as described in claim 1 wherein said inverter means comprises third transistor stage means and first and second speed-up capacitor means electrically interconnected to insure proper joining of the slope of the inverted wave and the slope of the emitter wave not inverted.

References Cited

UNITED STATES PATENTS 2,929,030 3/1960 Wier ---------------- 331—113

ROY LAKE, *Primary Examiner.*

S. H. GRIMM, *Assistant Examiner.*